(12) United States Patent
Mukherjee

(10) Patent No.: US 12,412,113 B2
(45) Date of Patent: Sep. 9, 2025

(54) MODEL OPTIMIZATION AND STABILIZATION USING QUANTUM COMPUTING

(71) Applicant: Bank of America Corporation, Charlotte, NC (US)

(72) Inventor: Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 684 days.

(21) Appl. No.: 17/663,728

(22) Filed: May 17, 2022

(65) Prior Publication Data

US 2023/0376820 A1 Nov. 23, 2023

(51) Int. Cl.
| | | |
|---|---|---|
| *G06N 10/60* | (2022.01) | |
| *A01K 61/80* | (2017.01) | |
| *G06N 20/00* | (2019.01) | |
| *G16B 50/00* | (2019.01) | |

(52) U.S. Cl.
CPC .................................... *G06N 10/60* (2022.01)

(58) Field of Classification Search
CPC ........ G06N 10/60; G06N 20/00; G16B 50/00; A01K 61/80
USPC .......................................................... 706/12
See application file for complete search history.

(56) References Cited

U.S. PATENT DOCUMENTS

| | | |
|---|---|---|
| 7,107,207 B2 | 9/2006 | Goodman |
| 7,266,492 B2 | 9/2007 | Goodman |
| 7,937,345 B2 | 5/2011 | Schmidtler et al. |
| 7,958,067 B2 | 6/2011 | Schmidtler et al. |
| 8,239,335 B2 | 8/2012 | Schmidtler et al. |
| 8,589,855 B1 | 11/2013 | Ward |
| 8,719,197 B2 | 5/2014 | Schmidtler et al. |
| 9,043,738 B1 | 5/2015 | Ward |
| 9,147,032 B2 | 9/2015 | Ward |
| 10,102,476 B2 | 10/2018 | Caraviello et al. |
| 10,176,435 B1 | 1/2019 | Sarkar et al. |

(Continued)

FOREIGN PATENT DOCUMENTS

| | | | | |
|---|---|---|---|---|
| CA | 3230919 A1 | * | 3/2023 | ............. A01K 61/80 |
| SG | 10201913208Q A | * | 2/2020 | ............. G16B 50/00 |
| WO | WO-2021160857 A1 | * | 8/2021 | ............. G06N 20/00 |

OTHER PUBLICATIONS

D-Wave Systems Inc. "Launch Your Quantum Journey Today" https://www.dwavesys.com/learn/quantum-computing, Copyright 2022.

*Primary Examiner* — Ruay Ho
(74) *Attorney, Agent, or Firm* — Banner & Witcoff, Ltd.

(57) ABSTRACT

Aspects of the disclosure relate to machine learning and quantum computing. A computing platform may receive historical information, which may include feature information and rate of change information. The computing platform may train, a ML model, by inputting the feature information and the rate of change information, which may make the ML model stable against data drift. The computing platform may receive a first query, input the first query into the ML model, to identify a solution to the first query, which may include identifying a first solution, perturbing the first solution a number of times, and ultimately identifying a second solution, more accurate than the first solution. The computing platform may send this second solution to the user device.

20 Claims, 8 Drawing Sheets

(56) References Cited

U.S. PATENT DOCUMENTS

| | | | |
|---|---|---|---|
| 10,327,159 B2 | 6/2019 | Tan et al. | |
| 10,360,517 B2 | 7/2019 | Koch et al. | |
| 10,402,723 B1 | 9/2019 | Silberman et al. | |
| 10,558,913 B1 | 2/2020 | Turner et al. | |
| 10,963,802 B1 | 3/2021 | Gardner et al. | |
| 11,010,669 B2 | 5/2021 | Turner et al. | |
| 11,023,822 B2 | 6/2021 | Mitarai | |
| 11,113,445 B2 | 9/2021 | Park et al. | |
| 11,120,368 B2 | 9/2021 | Varadarajan et al. | |
| 11,169,287 B2 | 11/2021 | Al-Saleh et al. | |
| 11,194,848 B2 | 12/2021 | Filonov et al. | |
| 11,315,030 B2 | 4/2022 | Cataltepe | |
| 11,322,259 B2 | 5/2022 | Do et al. | |
| 2020/0329233 A1* | 10/2020 | Nemirofsky | H04N 19/136 |
| 2021/0256351 A1* | 8/2021 | Cao | G06N 10/60 |
| 2022/0198254 A1* | 6/2022 | Dalli | G06N 3/084 |

* cited by examiner

MODEL OPTIMIZATION AND STABILIZATION USING QUANTUM COMPUTING

BACKGROUND

Aspects of the disclosure relate to machine learning (ML) models and data drift. In particular, data drift may result in degradation of model accuracy. For ML models, data drift may be represented by a change in input data, which ultimately leads to such degradation. For example, data drift may be caused by upstream process changes, data quality issues, natural drift, changes in feature relations, and/or otherwise. In some instances, data drift may be costly (both financially and computationally) in ML, as it may necessitate the rebuilding of models from scratch, which may include collecting new data, revalidating the data, rebuilding the model, and/or productizing the model. As ML models are increasingly implemented across various industries, it may be important to address inaccuracies of such models resulting from data drift.

SUMMARY

Aspects of the disclosure provide effective, efficient, scalable, and convenient technical solutions that address and overcome the technical problems associated with determining stable operating points to account for data drift in machine learning models. In accordance with one or more embodiments of the disclosure, a quantum computing platform comprising at least one processor, a communication interface, and memory storing computer-readable instructions may receive historical information, which may include feature information and rate of change information, indicating a speed at which the feature information is changing over time. The quantum computing platform may train a machine learning (ML) model to provide a ML result in response to a query, which may include inputting the feature information and the rate of change information to train the ML model to be stable against data drift of the historical information, and may include training a simulated annealing model to identify a global optimum solution for the query, which may be based on the feature information and the rate of change information. The quantum computing platform may receive, from a user device, a first query. The computing platform may input the first query into the ML model, which may cause the ML model to identify the ML result, by: 1) identifying a first local optimum solution, 2) perturbing the first local optimum solution a predetermined number of times based on a cooling rate of the simulated annealing model, which may cause the ML model to identify at least a second local optimum solution, that may be more accurate than the first local optimum solution, based on the feature information and the rate of change information, and 3) outputting, by the quantum computing platform, after perturbing the first local optimum the predetermined number of times, the second local optimum solution, which may be the global optimum solution. The quantum computing platform may send, to the user device, the global optimum solution and one or more commands directing the user device to display the global optimum solution, which may cause the user device to display the global optimum solution. The quantum computing platform may receive feedback information indicating a level of satisfaction with the global optimum solution. The quantum computing platform may input, into the ML model, the feedback information, to continually increase accuracy of the ML model.

In one or more instances, the global optimum solution may be different than a local optimum solution, and the local optimum solution may be based on the feature information and not the rate of change information. In one or more instances, the historical information may indicate preference information for a user of the user device over a period of time.

In one or more examples, the query may be a commercial query directed to an enterprise of the quantum computing platform. In one or more examples, the global optimum solution may be a minimum value of a convex data representation corresponding to the ML model.

In one or more instances, training the ML model to be stable against data drift may avoid further manual training of the ML model while maintaining accuracy of the ML model despite the data drift. In one or more instances, training the ML model may consume an amount of computing resources that exceeds those available on a standard computer processing unit (CPU).

In one or more instances, inputting the feature information to train the ML may further include selecting a subset of the feature information for use in training the ML model, where training the ML model using the subset of the feature information may consume less processing power than training the ML model using the feature information. In one or more instances, inputting the feature information to train the ML model may further include: 1) identifying one or more features, of the feature information, with a largest impact on the ML model, and 2) inputting, into the ML model, the identified one or more features and their corresponding rate of change information.

In one or more examples, inputting the rate of change information to train the ML model may further include: 1) identifying, one or more features, of the feature information, with a largest corresponding rate of change information; and 2) inputting, into the ML model, the identified one or more features and the corresponding rate of change information.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe a system and method for stable operating point determination to address data and/or concept drift. Data drift may be one of the top reasons that model accuracy degrades over time. For ML models, data drift may be the change in model input data that leads to model performance degradation. Monitoring data drift may help to detect these model performance issues. Causes of data drift may include: 1) upstream process changes (e.g., a sensor being replaced that changes the units of measurement from inches to centimeters), 2) data quality issues (e.g., a broken sensor always reading 0), 3) natural drift in the data (such as seasonal changes), 4) change in relation between features (e.g., covariate shift), and/or other causes.

Data drift may be a costly affair in ML because it may force models to be rebuilt from scratch. This may entail collecting new data, revalidating the data, and rebuilding/productizing the model. In this disclosure, a method of choosing and creating a model that is stable against data drifts, and that automatically corrects for the data drifts, is described herein.

ML methods may be described as an optimization problem. In regression type ML problems, the ultimate goal may be to fit a continuous curve through the test data that minimizes error. In the case of classification problems, the ultimate goal may be to divide the data or the solution space into clusters so that the error function of classification may be minimized.

Figure 5:
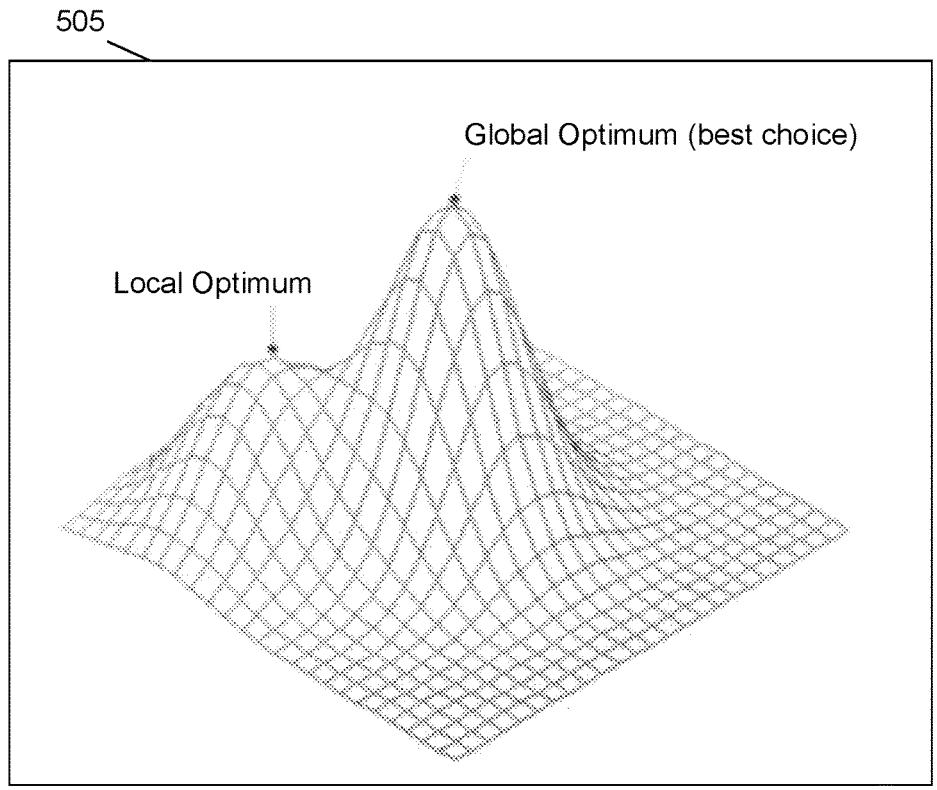
FIGS. 5 and 6 depict illustrative system diagrams for model optimization and stabilization using quantum computing in accordance with one or more example embodiments.

ML is also a mixed (e.g., discrete and continuous) domain of optimization problems with a multitude of variables. In this case, the problem may be classified as a non-deterministic, polynomial-time hardness ("NP-hard") problem, for which there does not exist an efficient algorithm for finding the global optimal solution, which is shown, for example, in diagram 505, which is illustrated in FIG. 5. All ML methods therefore settle down for a suboptimal solution that is a local optimal, using some suboptimal algorithm such as greedy method, steepest descent, hill climbing, and/or other methods. However, these local suboptimal solutions might not be optimized for stability against data drift.

Figure 6:
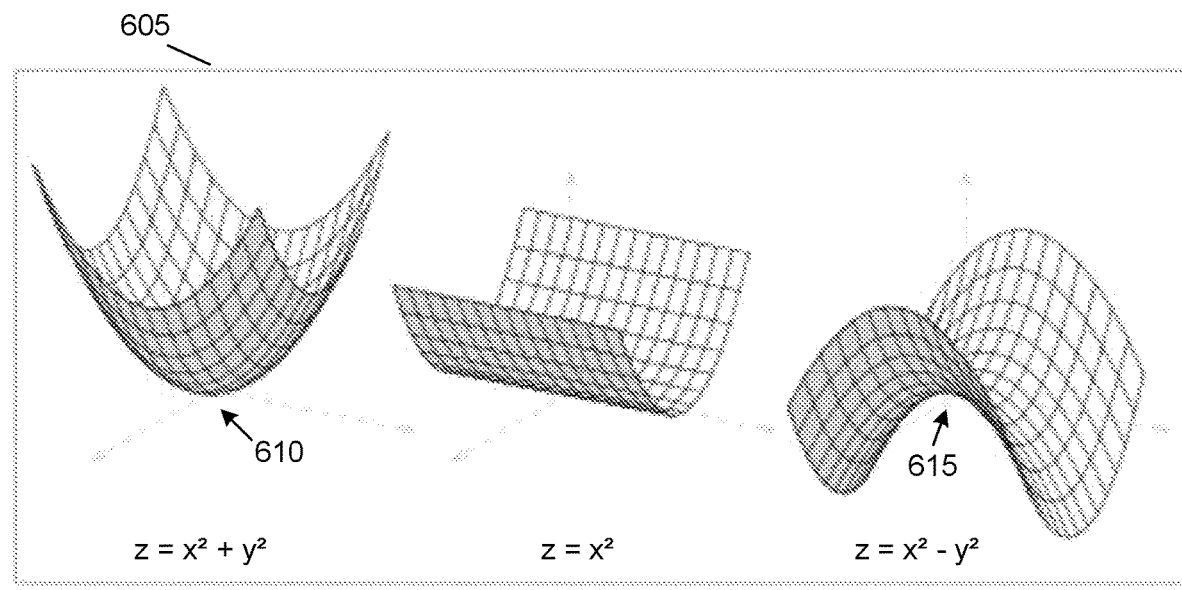

Consider the cusp point 610 shown on the left of diagram 605, which is illustrated in FIG. 6. This may be a stable solution point, since even if the solution drifts a bit it will roll back to the minimal point. This type of solution may be considered locally stable since the solution point itself is locally optimal. If the drift is too much, however, then the solution may need recalibration. Now consider the saddle point 615 on the right of diagram 605. This might not be considered a stable operating point. Although a drift in the x value may still bring it back to the minimal point, a drift in the y value may take it further and further away from the saddle point. Accordingly, the problem of finding a stable solution point may be to determine a local optima that may tolerate all drifts along the feature dimensions.

The drift or a change of a feature may be defined by the derivative of the features. In diagram 605, for example, the features of the right side may be defined as dz/dx for the variable x, or dz/dy for the variable y. In the discrete data domain, they may be approximated as DELTA(x) or DELTA (y). In order to find a stable optimal point, not only the feature vectors may be optimized, but also their derivatives.

In one embodiment, all the feature vectors along with their derivatives may be added for the optimization method, and then a stable optimization point may be obtained by any of the classical ML algorithms—followed by hyper parameter optimization. In another embodiment, all feature vectors along with their derivatives, as well as some of the higher order derivatives, may be used for added stability of the operating point. In another embodiment, only a selected group of features may be used for choosing the derivatives or higher order derivatives. This may be to increase the efficiency of the algorithm. The features whose derivatives are chosen may be further identified as those having the highest impact on the stability and more susceptible to data drift. In a further enhancement of this embodiment, the selected feature vectors with the highest impact on the stability and more susceptible to data drift may be identified automatically using another ML algorithm. Accordingly, described herein is a system and method to obtain a locally stable optimal solution for the ML method against data drift by adding one or more order of derivatives of one or more feature vectors along with those feature vectors to find a stable optimal solution.

Figure 1A:
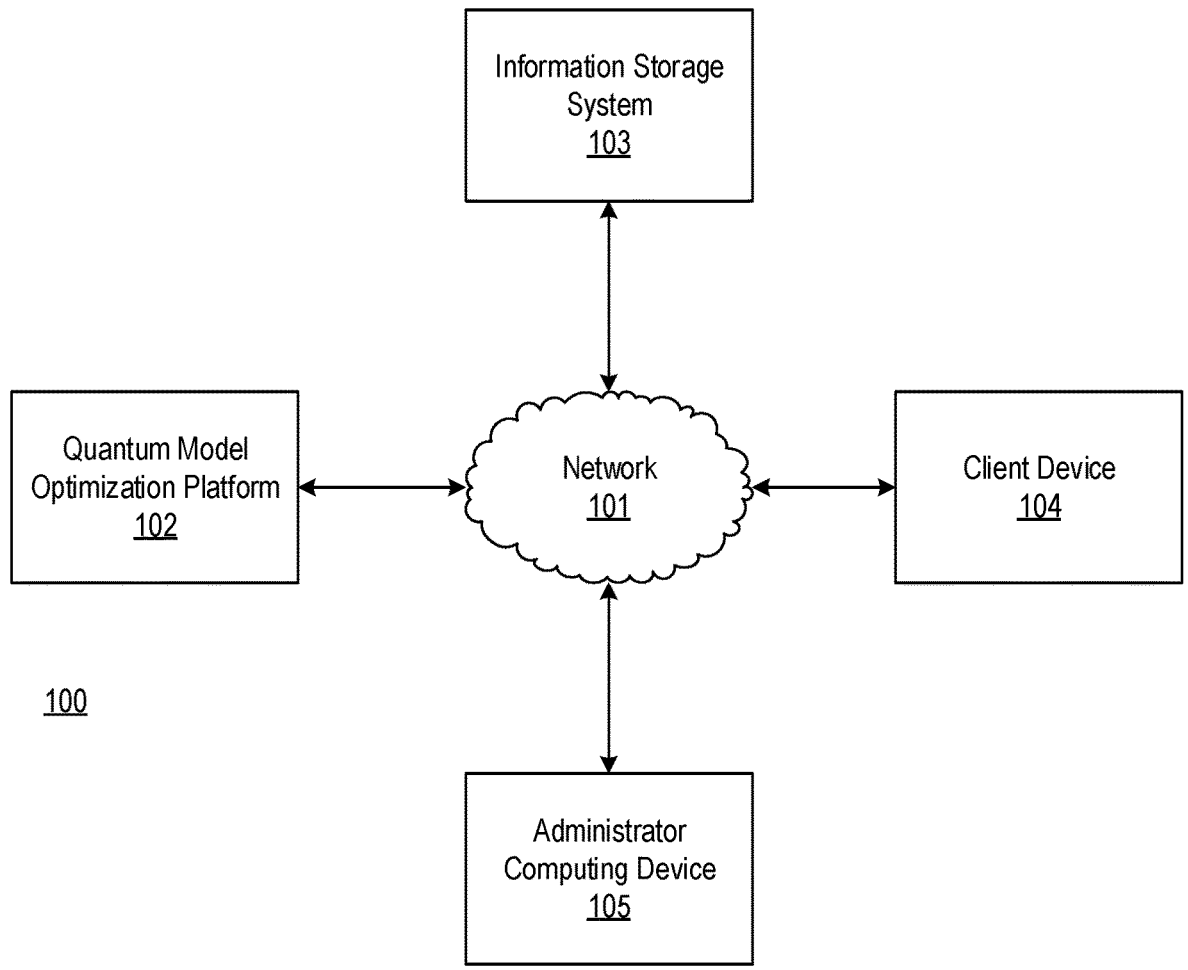
FIGS. 1A-1B depict an illustrative computing environment for model optimization and stabilization using quantum computing in accordance with one or more example embodiments.
Figure 1B:
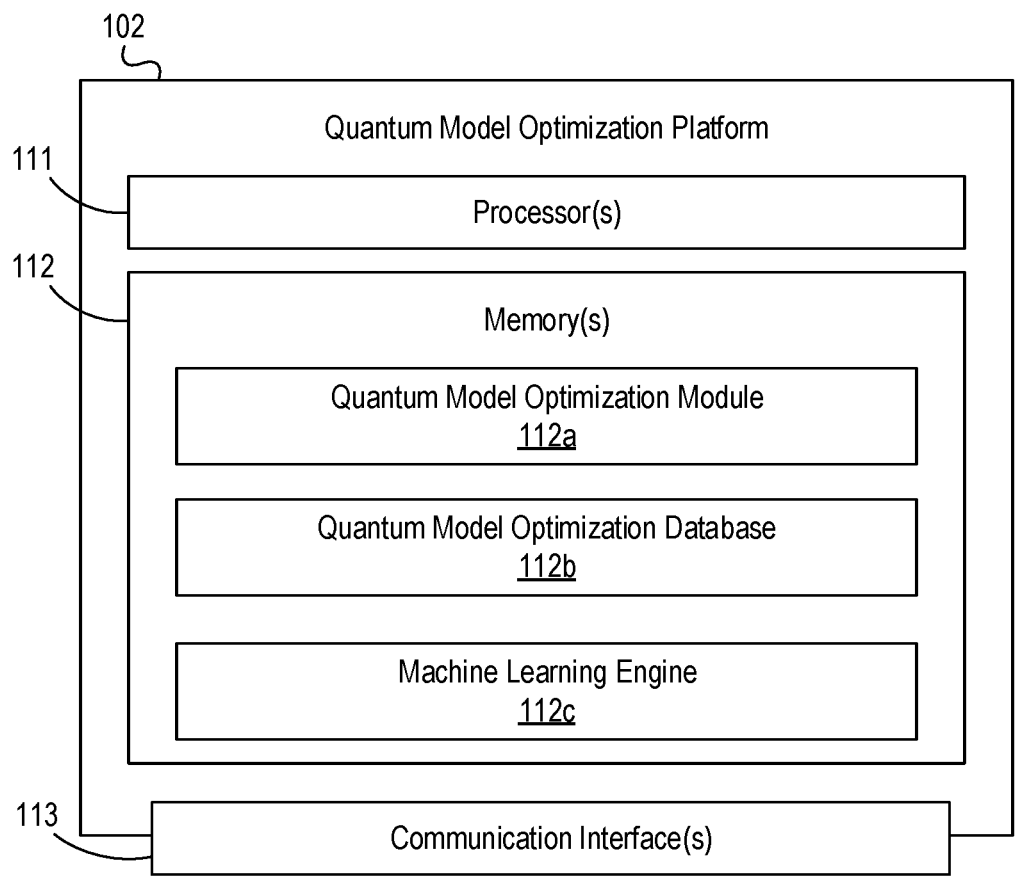

FIGS. 1A-1B depict an illustrative computing environment that implements model optimization and stabilization using quantum computing in accordance with one or more example embodiments. Referring to FIG. 1A, computing environment 100 may include one or more computer systems. For example, computing environment 100 may include quantum model optimization platform 102, and information storage system 103, a client device 104, and an administrator computing device 105.

As described further below, quantum model optimization platform 102 may be a computer system that includes one or more computing devices (e.g., servers, server blades, or the like) and/or other computer components (e.g., processors, memories, communication interfaces) that may train, host, and/or otherwise refine a stable ML model. In some instances, the quantum model optimization platform 102 may be a quantum computing device configured for processing that may exceed limits of a standard computer processing unit.

Information storage system 103 may include one or more computing devices (e.g., servers, server blades, and/or other devices) and/or other computer components (e.g., processors, memories, communication interfaces). In some instances, the information storage system 103 may store information that may be used to train the ML model hosted by the quantum model optimization platform 102 (e.g., demographic information, social networking information, income data, credit ratings, payment history information, preference information, and/or other information).

Client device 104 may be a mobile device, tablet, smartphone, laptop computer, desktop computer, and/or other computing device that may be used to submit a query or other request (e.g., request for a recommendation, or other request). In some instances, the client device 104 may be configured to access an application that may be configured to prompt a user for the request, and/or to direct requests to the quantum model optimization platform 102. In some instances, the client device 104 may be configured to display one or more user interfaces (e.g., query interfaces, recommendation interfaces, and/or other interfaces).

Administrator computing device 105 may be a mobile device, tablet, smartphone, laptop computer, desktop computer, and/or other computing device that may be used to perform initial training of the ML model hosted by the quantum model optimization platform 102. For example, the administrator computing device 105 may be used to configure datasets, parameters, rules, and/or other information of the ML model.

Computing environment 100 also may include one or more networks, which may interconnect quantum model optimization platform 102, information storage system 103, client device 104, administrator computing device 105, and/or other systems. For example, computing environment 100 may include a network 101 (which may interconnect, e.g., quantum model optimization platform 102, information storage system 103, client device 104, administrator computing device 105, and/or other systems).

In one or more arrangements, quantum model optimization platform 102, information storage system 103, client device 104, and/or administrator computing device 105 may be any type of computing device capable of sending and/or receiving requests and processing the requests accordingly. For example, quantum model optimization platform 102, information storage system 103, client device 104, administrator computing device 105 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of quantum model optimization platform 102, information storage system 103, client device 104, and/or administrator computing device 105, may, in some instances, be special-purpose computing devices configured to perform specific functions.

Referring to FIG. 1B, quantum model optimization platform 102 may include one or more processors 111, memory 112, and communication interface 113. A data bus may interconnect processor 111, memory 112, and communication interface 113. Communication interface 113 may be a network interface configured to support communication between quantum model optimization platform 102 and one or more networks (e.g., network 101, or the like). Memory 112 may include one or more program modules having instructions that when executed by processor 111 cause quantum model optimization platform 102 to perform one or more functions described herein and/or one or more databases that may store and/or otherwise maintain information which may be used by such program modules and/or processor 111. In some instances, the one or more program modules and/or databases may be stored by and/or maintained in different memory units of quantum model optimization platform 102 and/or by different computing devices that may form and/or otherwise make up quantum model optimization platform 102. For example, memory 112 may have, host, store, and/or include quantum model optimization module 112a, quantum model optimization database 112b, and machine learning engine 112c.

Quantum model optimization module 112a may have instructions that direct and/or cause quantum model optimization platform 102 to execute advanced techniques to provide model stability and/or account for data drift as discussed in greater detail below. Quantum model optimization database 112b may store information used by quantum model optimization module 112a and/or quantum model optimization platform 102 in application of advanced techniques to provide model stability and/or account for data drift, and/or in performing other functions. Machine learning engine 112c may train, host, and/or otherwise refine a stable ML model, which may be robust against data drift. In some instances, the machine learning engine 112c may iteratively and/or continuously refine the ML model so as to continuously improve model accuracy.

Figure 2A:
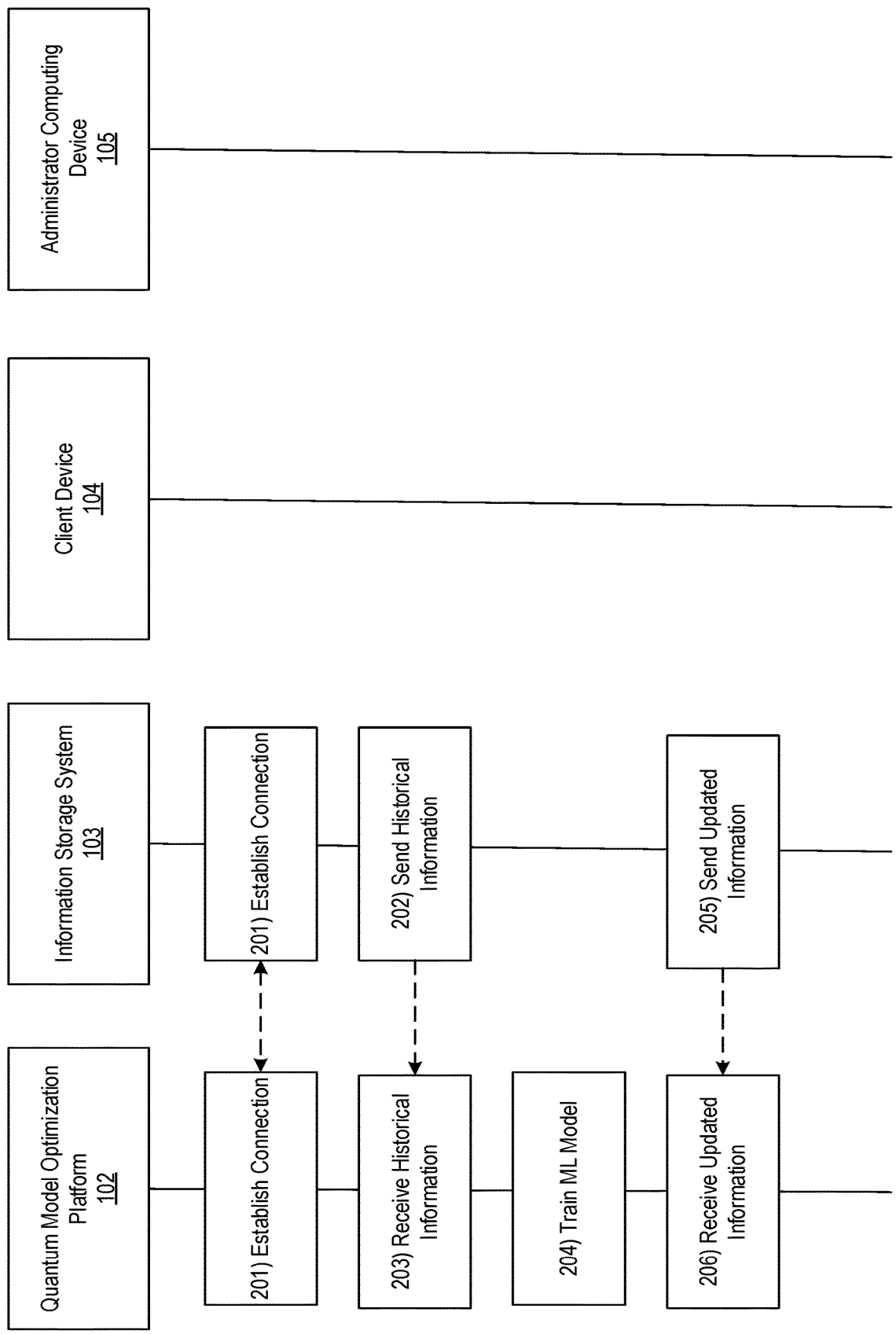
FIGS. 2A-2C depict an illustrative event sequence for model optimization and stabilization using quantum computing in accordance with one or more example embodiments.
Figure 2B:
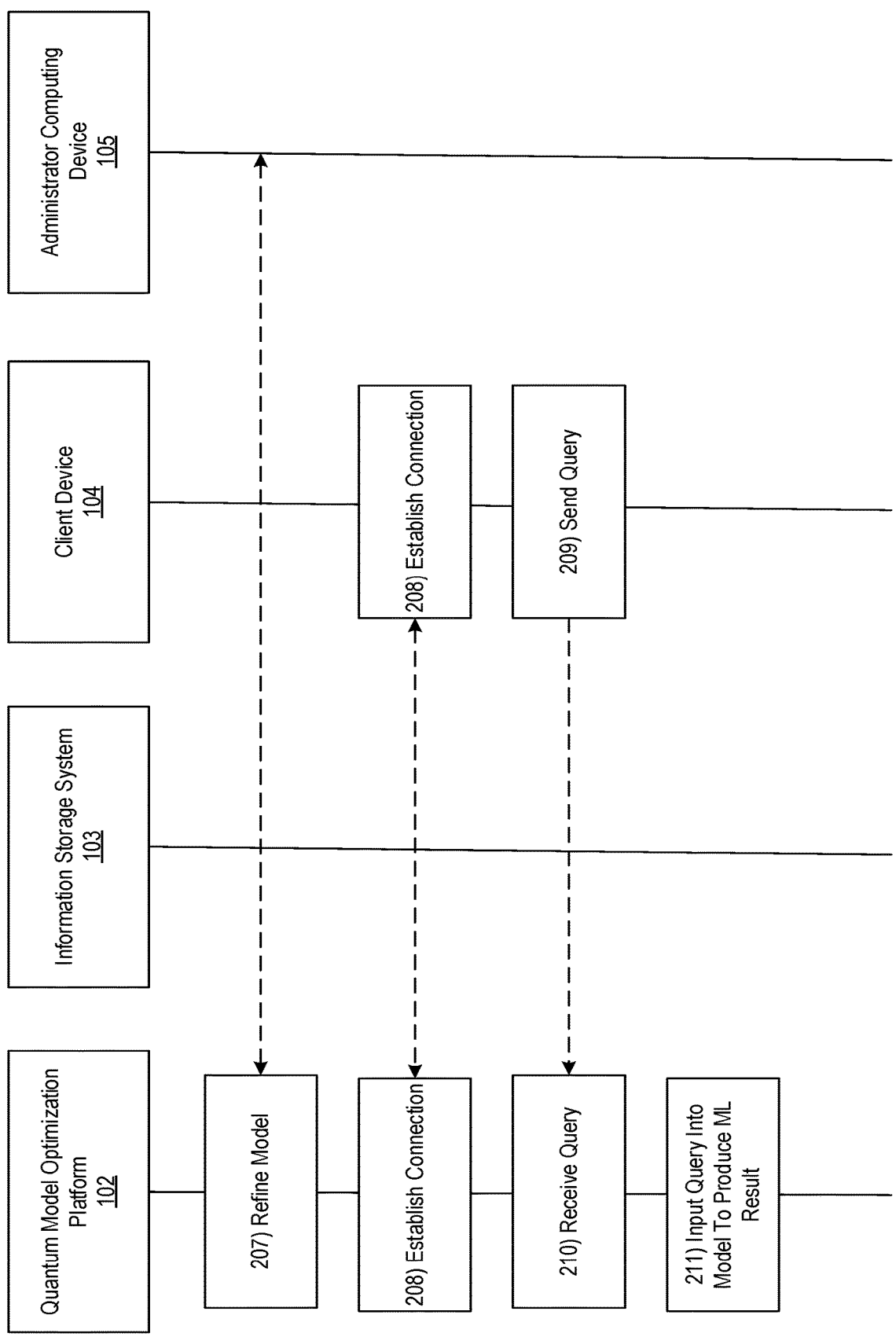
Figure 2C:
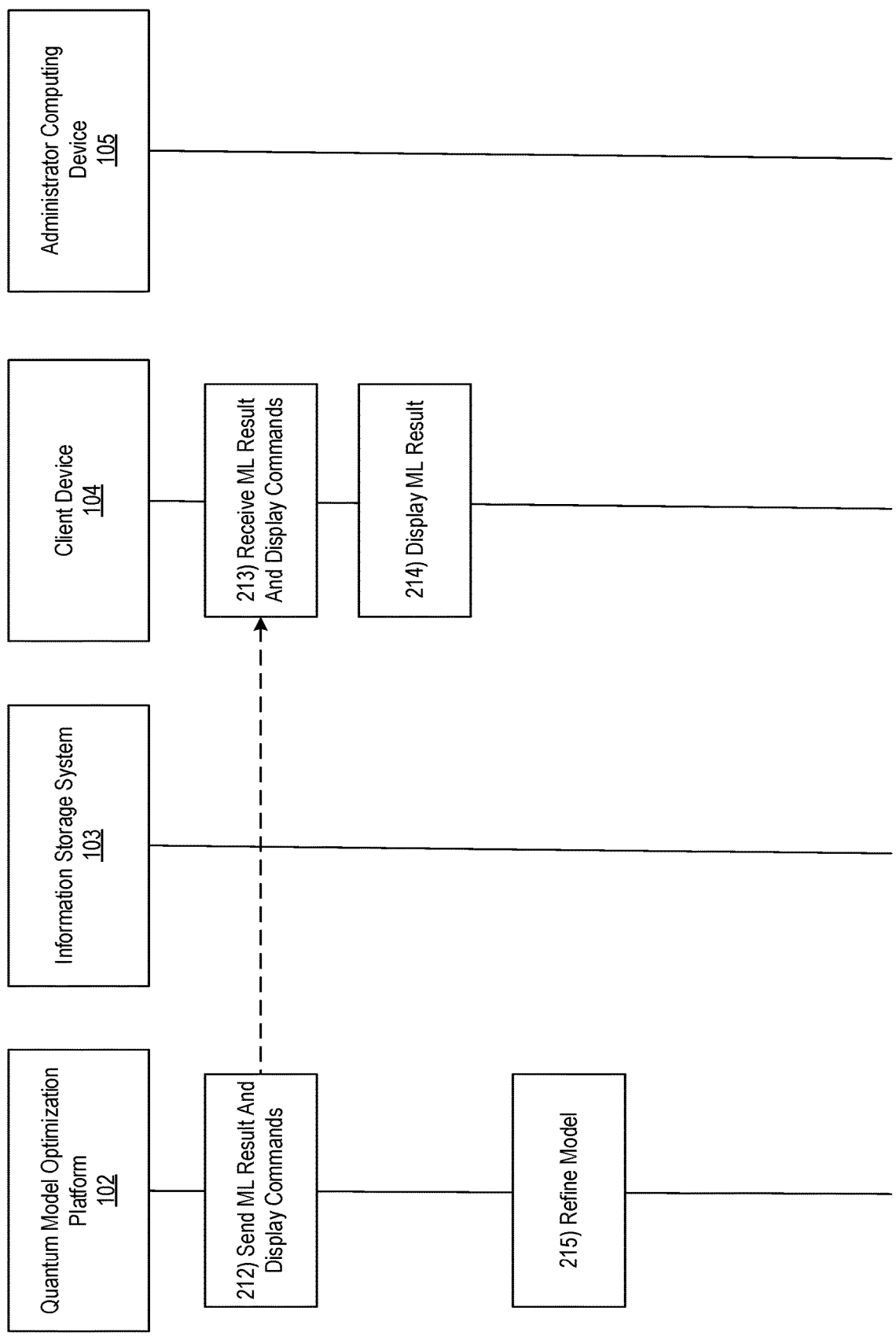

FIGS. 2A-2C depict an illustrative event sequence for model optimization and stabilization using quantum computing in accordance with one or more example embodiments. Referring to FIG. 2A, at step 201, the information storage system 103 may establish a connection with the quantum model optimization platform 102. For example, the information storage system 103 may establish a first wired or wireless data connection to link the information storage system 103 to the quantum model optimization platform 102 (e.g., in preparation for sending historical information). In some instances, the information storage system 103 may identify whether a connection is already established with the quantum model optimization platform 102. If a connection is already established with the quantum model optimization platform 102, the information storage system 103 might not re-establish the connection. If a connection is not yet established with the quantum model optimization platform 102, the information storage system 103 may establish the first connection as described herein.

At step 202, the information storage system 103 may send historical information (e.g., feature information) to the quantum model optimization platform 102. For example, the information storage system 103 may send historical information to the quantum model optimization platform 102 while the first connection is established. For example, in sending the historical information, the information storage system 103 may send information about a plurality of individuals (e.g., customers of an enterprise organization corresponding to the quantum model optimization platform 102, and/or other individuals) that may be used to train a ML model at the quantum model optimization platform 102 to provide recommendations to this plurality of individuals). In some instances, in sending the historical information, the information storage system 103 may send e.g., demographic information, social networking information, income data, credit ratings, payment history information, preference information, and/or other information.

At step 203, the quantum model optimization platform 102 may receive the historical information (e.g., feature information) sent at step 202. For example, the quantum model optimization platform 102 may receive the historical information via the communication interface 113 and while the first connection is established.

At step 204, the quantum model optimization platform 102 may train a ML model to output recommendation information (e.g., to customers of an enterprise corresponding to the quantum model optimization platform 102, and/or other individuals) automatically or in response to a query. In some instances, to train the ML model, the quantum model optimization platform 102 may identify, for different types of the historical information (e.g., feature information), a rate of change (e.g., a rate at which each type of the historical information is changing for each individual). The quantum model optimization platform 102 may then input these rates of change into the ML model along with the historical information. By training the ML model on both the historical information (e.g., feature information) and the rates of change, the quantum model optimization platform 102 may train a model that is robust and stable against data drift, without necessitating collection of new data, revalidation of the data, and/or rebuilding and/or productizing the ML model detecting drift in the corresponding data.

In some instances, in training the ML model, the quantum model optimization platform 102 may train a simulated annealing model to identify a global optimum solution as the model output (e.g., based on the feature information and the rate of change information). For example, the quantum model optimization platform 102 may set a cooling schedule (e.g., automatically—based on an amount of data available for the ML model, a use case, the type of feature information, the rate of change information, and/or other information—and/or based on user input from the administrator computing device), which may indicate a predetermined number of times that a local optimal solution, identified by the ML model, should be perturbed in an attempt to identify the global optimum solution. For example, the quantum model optimization platform 102 may train the ML model not to settle on simply a local optimal solution, but rather a global optimum solution (e.g., as is reflected in diagram 505).

At step 205, the information storage system 103 may send updated information (e.g., feature information) to the quantum model optimization platform 102. For example, the information storage system 103 may send information similar to the historical information sent at step 202, but that has deviated from the values of the historical information (e.g., representative of data drift). In some instances, the information storage system 103 may send the updated information while the first connection is established.

At step 206, the quantum model optimization platform 102 may receive the updated information, sent at step 205. For example, the quantum model optimization platform 102 may receive the updated information via the communication interface 113 and while the first connection is established.

Referring to FIG. 2B, at step 207, the quantum model optimization platform 102 may further refine the ML model based on the updated information (e.g., feature information). For example, the quantum model optimization platform 102 may further identify rate of change information for the various types of information on a per user basis, and update the ML model accordingly. In some instances, the discrepancies between the updated information and the historical information may represent data drift, indicating change in preferences, circumstances, and/or otherwise for various individuals.

In some instances, the initial training and/or refining of the ML model may involve communication with an administrator computing device 105 (e.g., to obtain manually input parameters, data, values, rules, and/or other information). For example, in some instances, the quantum model optimization platform 102 may communicate with the administrator computing device to select a subset of the historical and/or new information (e.g., feature information), using feature engineering, to train the ML model. In some instances, the feature engineering may be automatically performed by the quantum model optimization platform 102 and/or based on input from the administrator computing device 105. In some instances, in performing the feature engineering, the quantum model optimization platform 102 and/or administrator computing device 105 may identify one or more features, of the feature information, with a largest impact on the ML model, and may input the identified one or more features and their corresponding rate of change information into the ML model. Additionally or alternatively, in performing the feature engineering, the quantum model optimization platform 102 and/or administrator computing device 105 may identify one or more features, of the feature information, with a largest corresponding rate of change, and may input the identified one or more features and the corresponding rate of change information into the ML model. In doing so, the quantum model optimization platform 102 may consume less processing power in training the ML model than would otherwise be consumed if all of the historical and/or new information (e.g., feature information) were to be used. In some instances, similar feature engineering may be performed at step 204.

In some instances, the ML model may remain stable and robust (e.g., thus remaining accurate), without further manual training, despite the data drift corresponding to the updated information. For example, the ML model may have been trained, at step 204, using rate of change information, which may allow the ML model to automatically develop over time while maintaining accuracy and without needing manual recalibration based on the updated information.

In some instances, training the ML model, whether at step 204 or 207, the quantum model optimization platform 102 may execute processes that may consume an amount of computing resources that exceeds those available on a standard computer processing unit (CPU), but that may be supported by a quantum computing resource.

At step 208, the client device 104 may establish a connection with quantum model optimization platform 102. For example, the client device 104 may establish a second wired or wireless data connection with the quantum model optimization platform 102 to link the client device 104 to the quantum model optimization platform 102 (e.g., in preparation for sending queries). In some instances, the client device 104 may identify whether or not a connection is already established with the quantum model optimization platform 102. If a connection is already established with the quantum model optimization platform 102, the client device 104 might not re-establish the connection. If a connection is not yet established with the quantum model optimization platform 102, the client device 104 may establish the second connection as described herein.

At step 209, the client device 104 may send a query to the quantum model optimization platform 102. For example, the client device 104 may send a query to the quantum model optimization platform 102 prompting for a recommendation (e.g., product recommendation, service recommendation, answer to a question, chatbot interaction, and/or other information). In some instances, the client device 104 may send a query directed to a commercial enterprise, server, product, or the like (e.g., rather than a pure research query). In some instances, the client device 104 may send the query to the quantum model optimization platform 102 while the second connection is established.

At step 210, the quantum model optimization platform 102 may receive the query sent at step 209. For example, the quantum model optimization platform 102 may receive the query via the communication interface 113 and while the second connection is established. In some instances, steps 209 and 210 may be optional, and the quantum model optimization platform 102 may automatically identify, without being prompted by the client device 104, that a recommendation or other information, produced by the ML model, should be provided to the client device 104 (e.g., preconfigured recommendations and/or other information sent at a predetermined interval, or the like).

At step 211, the quantum model optimization platform 102 may input the query into the ML model to produce a ML result. For example, the quantum model optimization platform 102 may identify, by comparing the query to the information stored in the model (e.g., both historical and updated information and change rates) a first local optimum solution. After identifying the first local optimum solution, the quantum model optimization platform 102 may perturb the first local optimum solution, and identify a new local optimum solution based on the modification (which may ultimately be the same as the first local optimum solution, or may be a different local optimum solution, more accurate (e.g., corresponding to a greater confidence value) than the first local optimum solution). The quantum model optimization platform 102 may repeat this process of perturbing an identified local optimum and identifying a new optimum a number of times (e.g., one or more times) corresponding to a cooling schedule (which may e.g., include a predetermined number of times that the process should be repeated), and may decrease a counter, initially corresponding to the number of times, by one each time the process is repeated. A final optimum solution (e.g., a global optimum) may be identified by the quantum model optimization platform 102 once the count reaches zero. For example, the quantum model optimization platform 102 may execute a simulated annealing model, which may identify a number of local optimum results, based on a cooling schedule, before settling on a final global optimum, which may, e.g., be more accurate than the previously identified local optimums. In some instances, in settling on the global optimum solution, the quantum model optimization platform 102 may identify an ML result corresponding to a minimum value of a convex data representation corresponding to the ML model.

In some instances, in identifying the local optimums individually, the quantum model optimization platform 102 might not consider the rate of change information. However, by perturbing the local optimums (e.g., based on the rate of change information), the quantum model optimization platform 102 may ultimately take into account the rate of change information in identifying the global optimum solution, which may, e.g., be different than the first local optimum identified.

In some instances, in identifying the ML result, the quantum model optimization platform 102 may execute processes that may consume an amount of computing resources that exceeds those available on a standard CPU, but that may be supported by a quantum computing resource.

Referring to FIG. 2C, at step 212, the quantum model optimization platform 102 may send the ML result to the client device 104. For example, the quantum model optimization platform 102 may send the ML result to the client device 104 via the communication interface 113 and while the second connection is established. In some instances, the quantum model optimization platform 102 may also send one or more commands directing the client device 104 to display the ML result.

At step 213, the client device 104 may receive the ML result sent at step 212. For example, the client device 104 may receive the ML result while the second connection is established. In some instances, the client device 104 may also receive the one or more commands directing the client device 104 to display the ML result.

Figure 4:
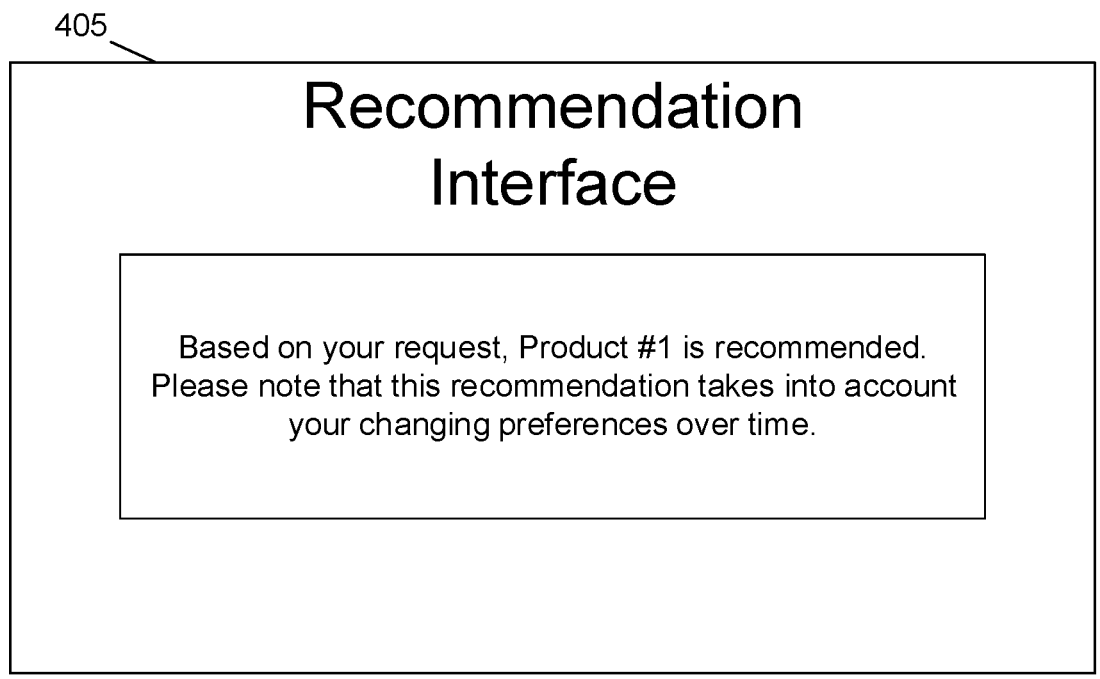
FIG. 4 depicts an illustrative graphical user interface for model optimization and stabilization using quantum computing in accordance with one or more example embodiments.

At step 214, based on or in response to the one or more commands directing the client device 104 to display the ML result, the client device 104 may display the ML result. For example, the client device 104 may display a graphical user interface similar to graphical user interface 405, which is shown in FIG. 4 (e.g., providing a recommendation and/or other information output from the ML model).

At step 215, the quantum model optimization platform 102 may refine the ML model based on the identified ML result and/or user feedback. For example, the quantum model optimization platform 102 may feed the ML result back into the ML model to continuously and dynamically improve accuracy of the ML model based on the analysis performed at step 211. Additionally or alternatively, the quantum model optimization platform 102 may receive user feedback (e.g., from the client device 104) indicating a level of satisfaction with the ML result. In doing so, the quantum model optimization platform 102 may establish a dynamic feedback loop, in which this user feedback is input back into the ML model to continuous and dynamically refine the ML model to increase accuracy.

Figure 3:
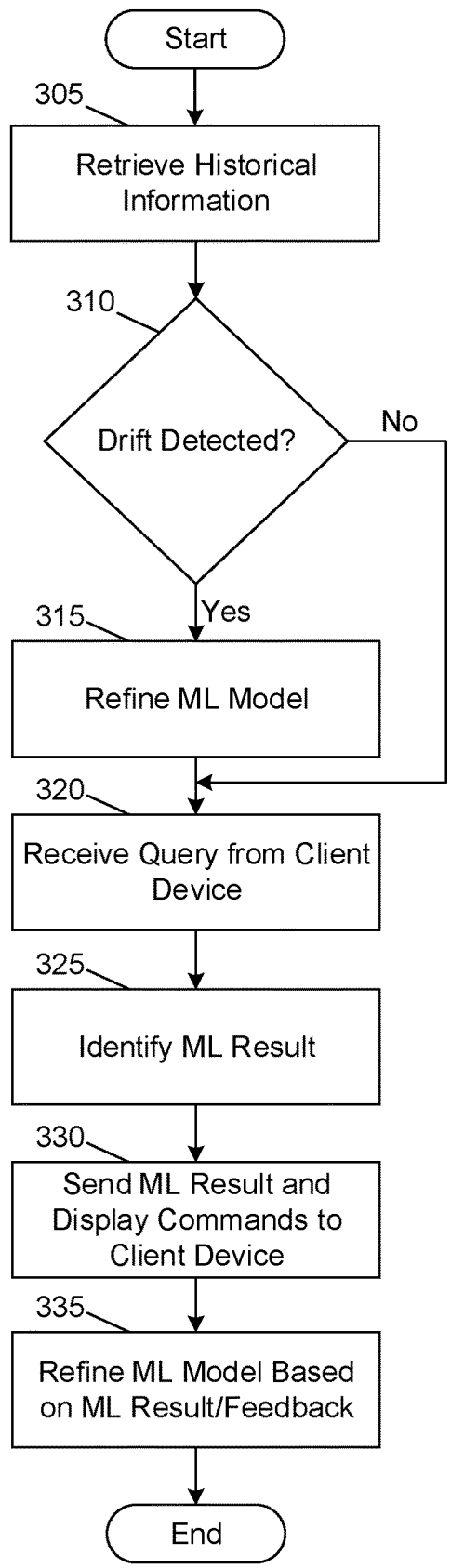
FIG. 3 depicts an illustrative method for model optimization and stabilization using quantum computing in accordance with one or more example embodiments.

FIG. 3 depicts an illustrative method for model optimization and stabilization using quantum computing in accordance with one or more example embodiments. Referring to FIG. 3, at step 305, a computing platform having at least one processor, a communication interface, and memory may retrieve historical information. At step 310, the computing platform may identify whether any new information has been received and/or whether data drift has been detected. If new information and/or data drift has not been detected, the computing platform may proceed to step 320. If new information and/or data drift has been detected, the computing platform may proceed to step 315.

At step 315, the computing platform may refine the ML model based on the new information. At step 320, the computing platform may receive a query from a client device. At step 325, the computing platform may identify a ML result responsive to the query. At step 330, the computing platform may send a ML result and one or more commands directing the client device to display the ML result. At step 335, the computing platform may refine the ML model based on the ML result and/or user feedback.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A quantum computing platform comprising:
at least one processor;
a communication interface communicatively coupled to the at least one processor; and
memory storing computer-readable instructions that, when executed by the at least one processor, cause the quantum computing platform to:
receive, by the quantum computing platform, historical information, wherein the historical information includes feature information and rate of change information, indicating a speed at which the feature information is changing over time;
train, by the quantum computing platform, a machine learning (ML) model to provide a ML result in response to a query, and wherein training the ML model comprises inputting the feature information and the rate of change information to train the ML model to be stable against data drift of the historical information, wherein training the ML model comprises training a simulated annealing model to identify a global optimum solution for the query, and wherein the global optimum solution is based on the feature information and the rate of change information;
receive, by the quantum computing platform and from a user device, a first query;
input, by the quantum computing platform, the first query into the ML model, wherein inputting the first query into the ML model causes the ML model to identify the ML result, wherein identifying the ML result comprises:
identifying a first local optimum solution;
perturbing the first local optimum solution a predetermined number of times based on a cooling rate of the simulated annealing model, wherein perturbing the first local optimum solution the predetermined number of times causes the ML model to identify at least a second local optimum solution, wherein the at least a second local optimum solution is more accurate than the first local optimum solution, based on the feature information and the rate of change information, and
outputting, by the quantum computing platform, after perturbing the first local optimum solution the predetermined number of times, the second local optimum solution, wherein the second local optimum solution comprises the global optimum solution;
send, by the quantum computing platform and to the user device, the global optimum solution and one or more commands directing the user device to display the global optimum solution, wherein sending the one or more commands directing the user device to display the global optimum solution causes the user device to display the global optimum solution;
receive, by the quantum computing platform, feedback information indicating a level of satisfaction with the global optimum solution; and
input, into the ML model, the feedback information, to continually increase accuracy of the ML model.

2. The quantum computing platform of claim 1, wherein the global optimum solution is different than a local optimum solution, and wherein the local optimum solution is based on the feature information and not the rate of change information.

3. The quantum computing platform of claim 1, wherein the historical information indicates preference information for a user of the user device over a period of time.

4. The quantum computing platform of claim 1, wherein the query comprises a commercial query directed to an enterprise of the quantum computing platform.

5. The quantum computing platform of claim 1, wherein the global optimum solution comprises a minimum value of a convex data representation corresponding to the ML model.

6. The quantum computing platform of claim 1, wherein training the ML model to be stable against data drift avoids further manual training of the ML model while maintaining accuracy of the ML model despite the data drift.

7. The quantum computing platform of claim 1, wherein training the ML model consumes an amount of computing resources that exceeds those available on a standard computer processing unit (CPU).

8. The quantum computing platform of claim 1, wherein inputting the feature information to train the ML model further comprises:
selecting a subset of the feature information for use in training the ML model, wherein training the ML model using the subset of the feature information consumes less processing power than training the ML model using the feature information.

9. The quantum computing platform of claim 8, wherein inputting the feature information to train the ML model further comprises:
identifying one or more features, of the feature information, with a largest impact on the ML model; and
inputting, into the ML model, the identified one or more features and their corresponding rate of change information.

10. The quantum computing platform of claim 8, wherein inputting the rate of change information to train the ML model further comprises:
identifying, one or more features, of the feature information, with a largest corresponding rate of change information; and
inputting, into the ML model, the identified one or more features and the corresponding rate of change information.

11. The quantum computing platform of claim 1, wherein the predetermined number of times comprises two or more.

12. A method comprising:
at a quantum computing platform comprising at least one processor, a communication interface, and memory:
receiving, by the quantum computing platform, historical information, wherein the historical information includes feature information and rate of change information, indicating a speed at which the feature information is changing over time;
training, by the quantum computing platform, a machine learning (ML) model to provide a ML result in response to a query, and wherein training the ML model comprises inputting the feature information and the rate of change information to train the ML model to be stable against data drift of the historical information, wherein training the ML model comprises training a simulated annealing model to identify a global optimum solution for the query, and wherein the global optimum solution is based on the feature information and the rate of change information;
receiving, by the quantum computing platform and from a user device, a first query;
inputting, by the quantum computing platform, the first query into the ML model, wherein inputting the first query into the ML model causes the ML model to identify the ML result, wherein identifying the ML result comprises:
identifying a first local optimum solution;
perturbing the first local optimum solution a predetermined number of times based on a cooling rate of the simulated annealing model, wherein perturbing the first local optimum solution the predetermined number of times causes the ML model to identify at least a second local optimum solution, wherein the at least a second local optimum solution is more accurate than the first local optimum solution, based on the feature information and the rate of change information, and
outputting, by the quantum computing platform, after perturbing the first local optimum solution the predetermined number of times, the second local optimum solution, wherein the second local optimum solution comprises the global optimum solution;
sending, by the quantum computing platform and to the user device, the global optimum solution and one or more commands directing the user device to display the global optimum solution, wherein sending the one or more commands directing the user device to display the global optimum solution causes the user device to display the global optimum solution;
receiving, by the quantum computing platform, feedback information indicating a level of satisfaction with the global optimum solution; and
inputting, into the ML model, the feedback information, to continually increase accuracy of the ML model.

13. The method of claim 12, wherein the global optimum solution is different than a local optimum solution, and wherein the local optimum solution is based on the feature information and not the rate of change information.

14. The method of claim 12, wherein the historical information indicates preference information for a user of the user device over a period of time.

15. The method of claim 12, wherein the query comprises a commercial query directed to an enterprise of the quantum computing platform.

16. The method of claim 12, wherein the global optimum solution comprises a minimum value of a convex data representation corresponding to the ML model.

17. The method of claim 12, wherein training the ML model to be stable against data drift avoids further manual training of the ML model while maintaining accuracy of the ML model despite the data drift.

18. The method of claim 12, wherein training the ML model consumes an amount of computing resources that exceeds those available on a standard computer processing unit (CPU).

19. The method of claim 12, wherein inputting the feature information to train the ML model further comprises:
selecting a subset of the feature information for use in training the ML model, wherein training the ML model using the subset of the feature information consumes less processing power than training the ML model using the feature information.

20. One or more non-transitory computer-readable media storing instructions that, when executed by a quantum computing platform comprising at least one processor, a communication interface, and memory, cause the quantum computing platform to:
receive, by the quantum computing platform, historical information, wherein the historical information includes feature information and rate of change information, indicating a speed at which the feature information is changing over time;
train, by the quantum computing platform, a machine learning (ML) model to provide a ML result in response to a query, and wherein training the ML model comprises inputting the feature information and the rate of change information to train the ML model to be stable against data drift of the historical information, wherein training the ML model comprises training a simulated annealing model to identify a global optimum solution for the query, and wherein the global optimum solution is based on the feature information and the rate of change information;
receive, by the quantum computing platform and from a user device, a first query;
input, by the quantum computing platform, the first query into the ML model, wherein inputting the first query into the ML model causes the ML model to identify the ML result, wherein identifying the ML result comprises:
identifying a first local optimum solution;

perturbing the first local optimum solution a predetermined number of times based on a cooling rate of the simulated annealing model, wherein perturbing the first local optimum solution the predetermined number of times causes the ML model to identify at least a second local optimum solution, wherein the at least a second local optimum solution is more accurate than the first local optimum solution, based on the feature information and the rate of change information, and outputting, by the quantum computing platform, after perturbing the first local optimum solution the predetermined number of times, the second local optimum solution, wherein the second local optimum solution comprises the global optimum solution;

send, by the quantum computing platform and to the user device, the global optimum solution and one or more commands directing the user device to display the global optimum solution, wherein sending the one or more commands directing the user device to display the global optimum solution causes the user device to display the global optimum solution;

receive, by the quantum computing platform, feedback information indicating a level of satisfaction with the global optimum solution; and input, into the ML model, the feedback information, to continually increase accuracy of the ML model.

* * * * *